(12) United States Patent
Chang

(10) Patent No.: US 11,450,209 B2
(45) Date of Patent: Sep. 20, 2022

(54) VEHICLE AND METHOD FOR CONTROLLING THEREOF

(71) Applicants: Hyundai Motor Company, Seoul (KR); Kia Motors Corporation, Seoul (KR)

(72) Inventor: Kyoung Jin Chang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 17/082,649

(22) Filed: Oct. 28, 2020

(65) Prior Publication Data

US 2021/0407295 A1    Dec. 30, 2021

(30) Foreign Application Priority Data

Jun. 26, 2020    (KR) .......................... 10-2020-0078535

(51) Int. Cl.
    *G08G 1/16*    (2006.01)
    *G10K 15/04*   (2006.01)
    *G06V 40/16*   (2022.01)

(52) U.S. Cl.
    CPC ............. *G08G 1/16* (2013.01); *G06V 40/174* (2022.01); *G10K 15/04* (2013.01)

(58) Field of Classification Search
    CPC ......... G08G 1/16; G06V 40/174; G10K 15/04
    See application file for complete search history.

(56) References Cited

U.S. PATENT DOCUMENTS

| 2005/0121256 | A1* | 6/2005 | Hofmann | G10K 11/22 181/271 |
| 2009/0066499 | A1* | 3/2009 | Bai | G10K 15/02 340/459 |
| 2011/0188663 | A1* | 8/2011 | Nakayama | G10K 15/02 381/86 |
| 2012/0106748 | A1* | 5/2012 | Peachey | G10K 15/04 381/61 |
| 2014/0229076 | A1* | 8/2014 | Doering | F16H 63/42 701/36 |
| 2016/0101726 | A1* | 4/2016 | Chang | B60Q 9/00 381/86 |

(Continued)

FOREIGN PATENT DOCUMENTS

| CN | 110364140 A | 10/2019 |
| CN | 105893460 B | 11/2019 |
| KR | 101886534 B1 | 8/2018 |

(Continued)

*Primary Examiner* — Mohamed Barakat
(74) *Attorney, Agent, or Firm* — Fox Rothschild LLP

(57) ABSTRACT

A vehicle outputs a driving sound generated based on the driver's preference rather than outputting a uniform driving sound. The vehicle includes a sensor that acquires at least one of a facial image, an audio signal, and a biometric signal. A database stores a plurality of sound sources classified according to driver information. A controller calculates the driver information based on at least one of the facial image, the audio signal, and the biometric signal, selects any one of the plurality of sound sources stored in the database based on the calculated driver information, generates a driving sound based on the selected sound source, and operates a speaker to output the generated driving sound.

22 Claims, 6 Drawing Sheets

(56) References Cited

U.S. PATENT DOCUMENTS

2016/0144782 A1* 5/2016 Jo .......................... H04R 3/00
　　　　　　　　　　　　　　　　　　　　　　381/86
2019/0304418 A1　10/2019　Silverstein

FOREIGN PATENT DOCUMENTS

| KR | 101982345 B1 | 5/2019 |
| KR | 2019-0100543 A | 8/2019 |
| KR | 2019-0137727 A | 12/2019 |

* cited by examiner

VEHICLE AND METHOD FOR CONTROLLING THEREOF

CROSS-REFERENCE TO RELATED APPLICATION(S)

The present application claims priority to Korean Patent Application No 10-2020-0078535, filed on Jun. 26, 2020, the entire contents of which is incorporated herein for all purposes by this reference.

BACKGROUND

Field of the Disclosure

The present disclosure relates to a vehicle and a control method thereof that select a sound source based on a driver's emotion, gender, and age, synthesize the selected sound source, and output a driving sound.

Description of Related Art

In modern society, automobiles are the mostly used as a means of transportation. In the past, automobiles did not exist more than simply than as a means of transportation, but in the modern world, vehicles are widely used as a means of expressing themselves or enjoying a drive beyond just a means of transportation. Accordingly, there are many people who enjoy speed like motorbikes and racing vehicles, and those who enjoy such speeds feel a lot of excitement not only from the speed of the vehicle, but also from the operating sound and vibration sound generated by the engine of the vehicle. Accordingly, some drivers use the engine by modifying the engine to obtain the driving sound they desire.

In particular, in the case of an electric vehicle, since the operating sound and vibration sound generated by the vehicle engine are absent, the driving sound artificially generated through the speaker is also output. However, since the driving sound provided to the vehicle is a driving sound previously designed by the manufacturer, it is difficult to satisfy the driver's demand.

SUMMARY

A vehicle and a controlling method thereof provides outputting driving sound by selecting a sound source according to a preference of a driver's emotion, gender and age.

In accordance with an aspect of the present disclosure, a vehicle may include a sensor configured to acquire at least one of a driver's facial image, an audio signal, and a biometric signal; a database configured to store a plurality of sound sources classified according to driver information; a speaker; and a controller configured to calculate the driver information based on at least one of the driver's facial image, the audio signal, and the biometric signal, select any one of the plurality of sound sources stored in the database based on the calculated driver information, generate a driving sound based on the selected sound source, and operate the speaker to output the generated driving sound.

The driver information may include a score by emotional state, gender, and age of the driver. The sensor may include at least one of a camera configured to acquire the driver's facial image, a microphone configured to acquire the driver's audio signal, and a biometric signal sensor configured to acquire the driver's biometric signal. The controller may be configured to calculate the driver information by using the driver's facial image as input data of R-CNN (Region Based Convolution Neural Networks) that have been learned in advance.

The controller may be configured to calculate the driver information using the driver's audio signal as input data of LSTM (Long Short-Term Memory). The controller may be configured to determine open degree of the driver's mouth based on the driver's facial image, and use the driver's audio signal as the input data of the LSTM only when the open degree of the driver's mouth is greater than a preset value. The controller may be configured to calculate the driver information using the driver's biometric signal as input data of LSTM (Long Short-Term Memory).

The vehicle may further include a first bandpass filter configured to pass a signal in a first frequency band; and a second bandpass filter configured to pass a signal in a second frequency band. The controller may use each of the driver's biometric signal passing through the first bandpass filter and the driver's biometric signal passing through the second bandpass filter as input data of the LSTM (Long Short Term Memory). The controller may be configured to determine a plurality of target engine sound orders based on at least one of an output torque, speed, and accelerator pedal pressure of the vehicle, and synthesize the driving sound based on the selected sound source and the plurality of target engine sound.

The controller may be configured to select some of the target engine sound orders of the plurality of target engine sound orders based on the calculated driver information, and synthesize the driving sound based on the selected sound source and the some selected target engine sound orders. In addition, the controller may be configured to determine volume of the driving sound based on at least one of an output torque, speed, and accelerator pedal pressure of the vehicle.

In accordance with an aspect of the present disclosure, a controlling method of a vehicle including a database storing a plurality of sound sources classified according to driver information, the method may include acquiring at least one of a driver's facial image, an audio signal, and a biometric signal; calculating the driver information based on at least one of the driver's facial image, the audio signal, and the biometric signal, selecting any one of the plurality of sound sources stored in the database based on the calculated driver information, generating a driving sound based on the selected sound source, and operating the speaker to output the generated driving sound.

The driver information may include a score by emotional state, gender, and age of the driver. The acquiring of at least one of a driver's facial image, an audio signal, and a biometric signal; may include performing by the sensor that includes at least one of a camera that acquires the driver's facial image, a microphone that acquires the driver's audio signal, and a biometric signal sensor that acquires the driver's biometric signal.

The calculating the driver information may include calculating the driver information by using the driver's facial image as input data of R-CNN (Region Based Convolution Neural Networks) that have been learned in advance. The calculating the driver information may include calculating the driver information using the driver's audio signal as input data of LSTM (Long Short-Term Memory).

The calculating of the driver information may include calculating the driver information using the driver's audio signal as input data of LSTM (Long Short-Term Memory) may include determining open degree of the driver's mouth based on the driver's facial image, and using the driver's audio signal as the input data of the LSTM only when the open degree of the driver's mouth is greater than a preset value. The calculating of the driver information may include calculating the driver information using the driver's biometric signal as input data of LSTM (Long Short-Term Memory).

Additionally, the calculating of the driver information may include calculating the driver information using the driver's biometric signal as input data of LSTM (Long Short-Term Memory) and include using each of the driver's biometric signal passing through the first bandpass filter passing a signal in a first frequency band and the driver's biometric signal passing through the second bandpass filter passing a signal in a second frequency band. The generating of the driving sound based on the selected sound source may include determining a plurality of target engine sound orders based on at least one of an output torque, speed, and accelerator pedal pressure of the vehicle, and synthesizing the driving sound based on the selected sound source and the plurality of target engine sound.

The synthesizing of the driving sound based on the selected sound source and the plurality of target engine sound may include selecting some of the target engine sound orders of the plurality of target engine sound orders based on the calculated driver information, and synthesizing the driving sound based on the selected sound source and the some selected target engine sound orders. The generating of the driving sound based on the selected sound source may further include determining volume of the driving sound based on at least one of an output torque, speed, and accelerator pedal pressure of the vehicle.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
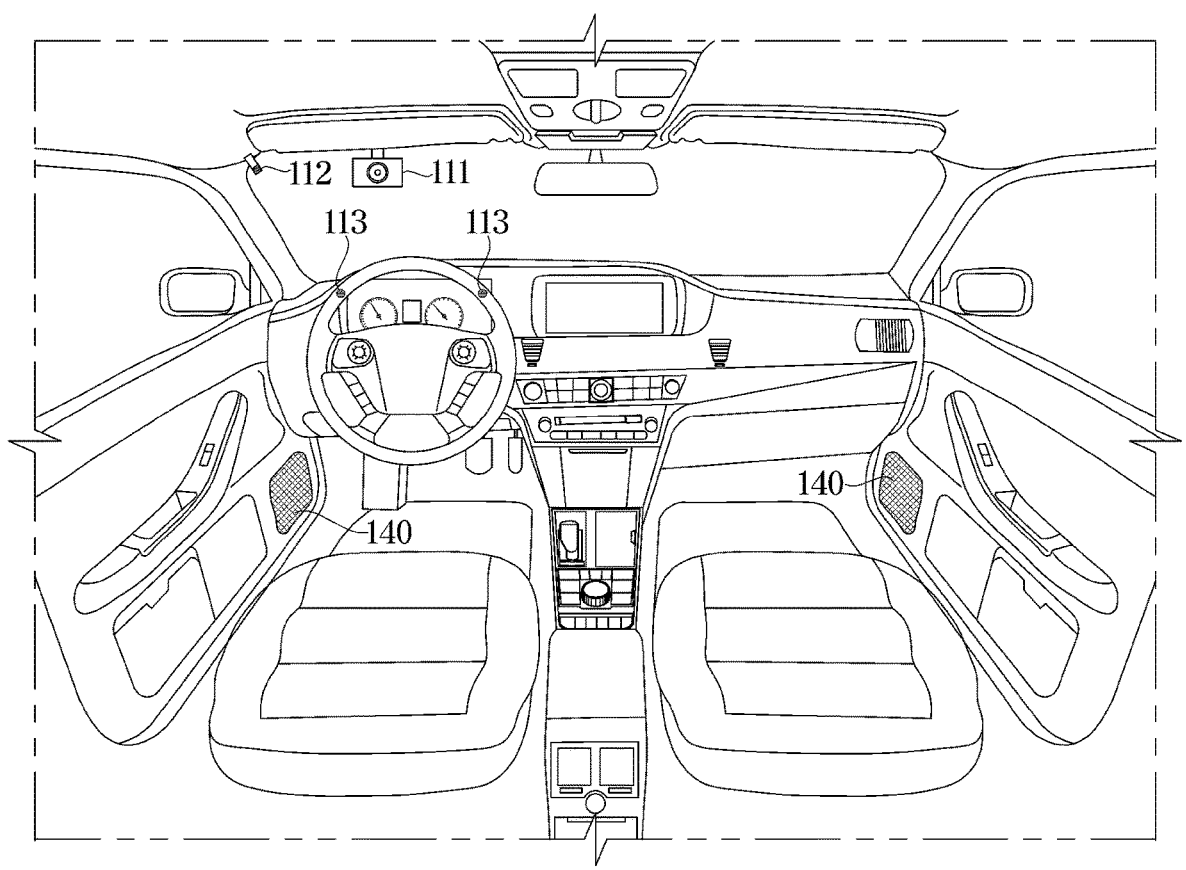
FIG. 1 is a diagram illustrating an interior of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present disclosure belongs. Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated. Singular expressions include plural expressions unless the context clearly indicates an exception. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network. In addition, when a part is said to "include" a certain component, this means that it may further include other components, except to exclude other components unless otherwise stated.

In addition, terms such as "~ unit", "~ group", "~ block", "~ member", and "~ module" may mean a unit that processes at least one function or operation. For example, the terms may refer to at least one hardware such as Field-Programmable Gate Array (FPGA)/Application Specific Integrated Circuit (ASIC), at least one software stored in a memory, or at least one process processed by a processor. The symbols attached to each step are used to identify each step, and these symbols do not indicate the order of each step, and each step is executed differently from the specified order unless a specific order is clearly stated in the context.

Hereinafter, with reference to the accompanying drawings will be described the working principle and exemplary embodiments of the present disclosure. FIG. 1 is a diagram illustrating an interior of a vehicle according to an exemplary embodiment. Referring to FIG. 1, a vehicle according to an exemplary embodiment may include a camera 111 having a photographing area facing the interior of the vehicle, a microphone 112 that acquires an audio signal emitted from inside the vehicle, a biometric signal sensor 113 attached to the steering wheel configured to obtain a biometric signal of the driver, and a speaker 140 configured to output various sounds inside the vehicle.

The camera 111 may be disposed above the driver's seat, but may be provided without limitation as long as it is a position where a driver's facial image may be acquired. The microphone 112 may also be disposed on the upper side of the driver's seat, but may be provided without limitation as long as it is a location where an audio signal of the driver may be obtained. The biometric signal sensor 113 may be disposed at various locations in the vehicle. For example, the biometric signal sensor 113 may be disposed on a seat, a seat belt, a steering wheel, and a handle provided on a door.

For example, the biometric signal sensor 113 may include, but is not limited to, a core diagram sensor disposed on a steering wheel to detect an electrocardiogram signal from a driver's hand. For example, the biometric signal sensor 113 may include a body temperature sensor installed in a driver's seat of a vehicle to sense a driver's body temperature, and a receiving device configured to acquire a biometric signal from a driver's wearable device. As an example of a biometric signal, there are an electromyogram signal, an electrocardiogram signal, an electroencephalogram signal, and a safety signal. The speaker 140 may be provided on both doors of the vehicle, but may be provided without limitation as long as the driver inside the vehicle is capable of hearing the sound output.

Figure 2:
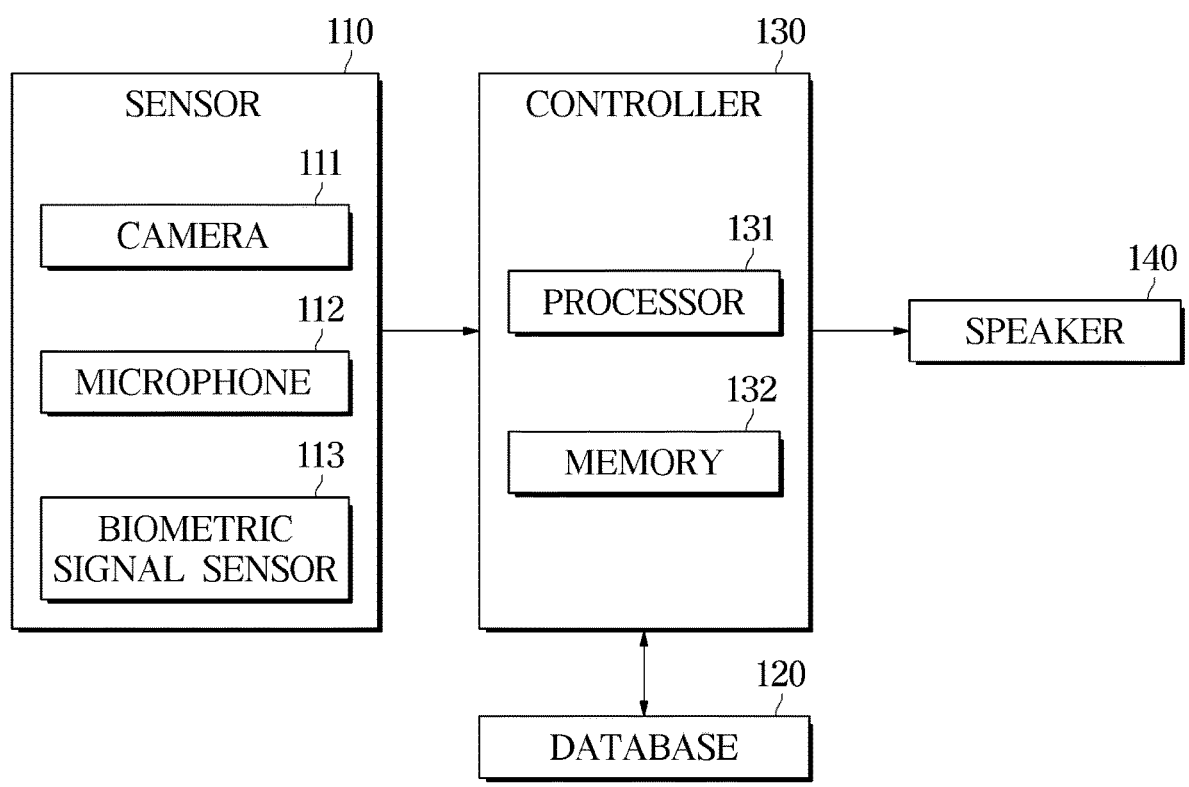
FIG. 2 is a control block diagram of a vehicle according to an exemplary embodiment.

FIG. 2 is a control block diagram of a vehicle according to an exemplary embodiment. Referring to FIG. 2, the vehicle may include a sensor 110 configured to acquire at least one of a driver's facial image, an audio signal, and a biometric signal, a database 120 configured to store a plurality of sound sources classified according to driver information such as scores for each emotional state, gender and age, a controller 130 configured to select a sound source from the database 120, generate a driving sound based on the sound source, and output the speaker 140, and a speaker 140 configured to output driving sound under control of controller 130.

The sensor 110 according to an exemplary embodiment may include a camera 111 configured to acquire a driver's facial image, a microphone 112 configured to acquire an audio signal of the driver, and a biometric signal sensor 113 configured to acquire a biometric signal of the driver. The camera 111 may be configured to acquire a facial image by photographing the driver's face and transmit the acquired facial image to the controller 130, the microphone 112 may be configured to receive the driver's audio signal, perform amplification, noise removal, etc., and transmit the driver's audio signal to the controller 130, and the biometric signal sensor 113 may be configured to receive the driver's biometric signal and perform processing such as amplification and noise removal, and transmit the driver's biometric signal to the controller 130.

The database 120 according to an exemplary embodiment may be configured to store a plurality of sound sources classified according to driver information such as scores for each emotional state, gender, and age. For example, the database 120 may be configured to store a plurality of sound sources classified as a joy state, and a plurality of sound sources classified as a joy state may be once again distinguished within a category of a joy state according to the score of the joy state. In addition, the database 120 may be configured to store a plurality of sound sources classified according to gender, and store a plurality of sound sources classified according to age.

The database 120 may be implemented by at least one of a Nonvolatile memory devices such as cache, Read Only Memory (ROM), Programmable ROM (PROM), Erasable Programmable ROM (EPROM), Electrically Erasable Programmable ROM (EEPROM), and Flash memory, or a volatile memory device such as random access memory (RAM), or a storage medium such as a hard disk drive (HDD) or CD-ROM for this purpose to store various information, but is not limited thereto. The database 120 may be a memory implemented as a separate chip, or a processor 131 corresponding to the controller 130 and a single chip.

Specifically, the database 120 may be configured to store a sound source corresponding to a case where the driver's joy state score is 75, the gender is male, and the age is 30 years. The controller 130 according to an exemplary embodiment may be configured to calculate driver information based on data received from the sensor 110. For example, the controller 130 may be configured to determine the score, sex, and age for each driver's emotional state based on data received from the sensor 110, select a sound source corresponding to a score, gender, and age for each driver's emotional state from the database 120, and synthesize the selected sound source to generate a driving sound.

The controller 130 may include at least one memory 132 configured to store various programs such as a program for calculating driver information including scores, gender and age for each driver's emotional state, a program for generating driving sound, a program for controlling the speaker 140, and at least one processor 131 capable of executing a program stored in at least one memory 132.

A program for determining the score, sec, and age of the driver's emotional state stored in the memory 132 includes an artificial intelligence algorithms (artificial neural network models) such as Convolutional Neural Networks (CNN) algorithm, Generative Adversarial Networks (GAN) algorithm, Recurrent Neural Networks (RNN) algorithm, LSTM (Long Short-Term Memory) algorithm, a kind of RNN algorithm, Region Based Convolutional Neural Networks (R-CNN) Algorithm.

The speaker 140 according to an exemplary embodiment may be configured to output a control signal (e.g., electrical signal) received from the controller 130 as driving sound. For this purpose, the speaker 140 may include a voice coil and an amplifier that controls the volume of the output sound by adjusting the amount of current supplied to the voice coil. Various components of the vehicle according to the exemplary embodiment have been described in detail above. It goes without saying that the various components of the vehicle described above may be freely changed at the level of the general technical range. Hereinafter, a method of controlling a vehicle using various components of the vehicle described above will be described in detail.

Figure 3:
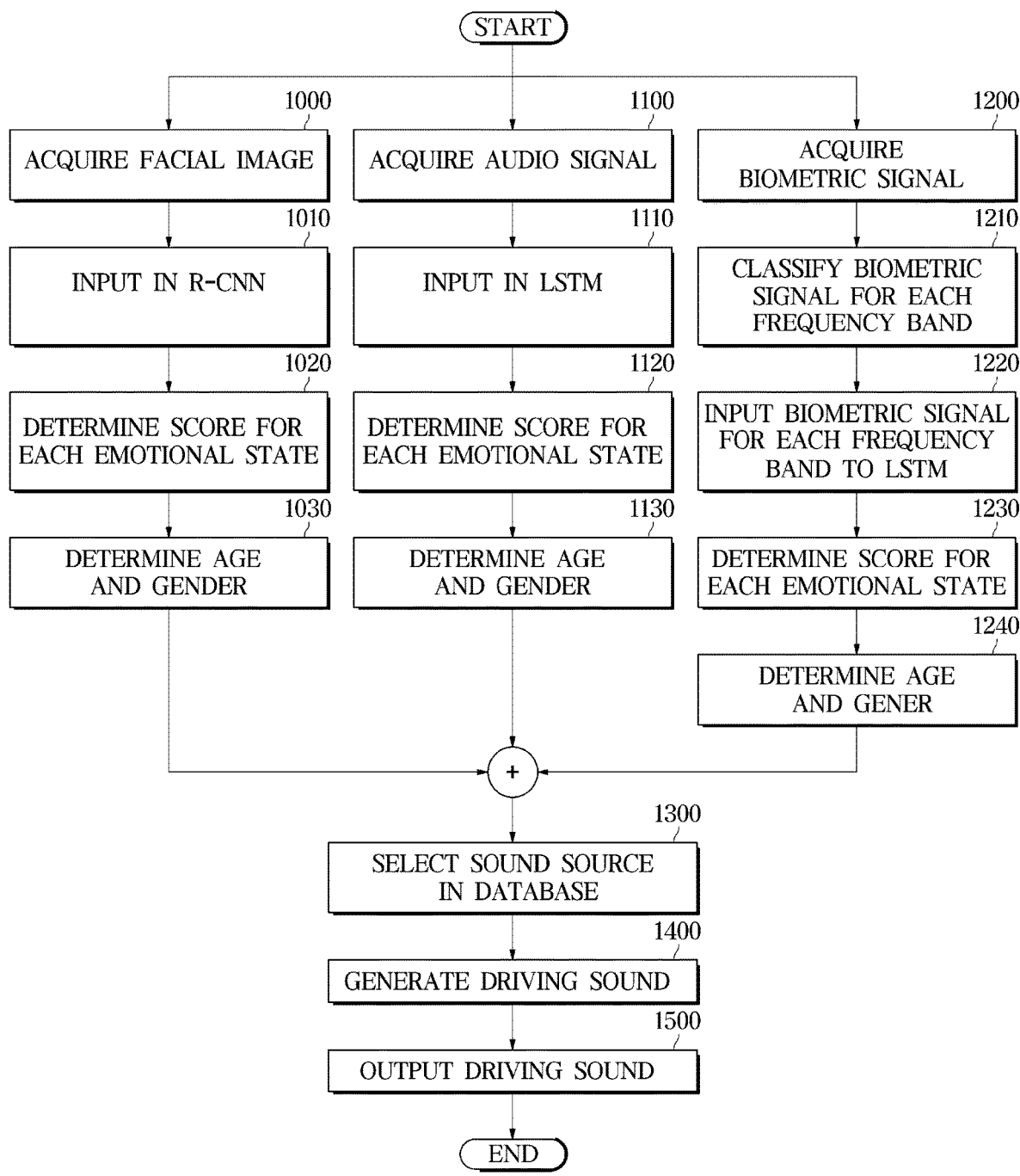
FIG. 3 is a flowchart illustrating a vehicle control according to an exemplary embodiment.
Figure 4:
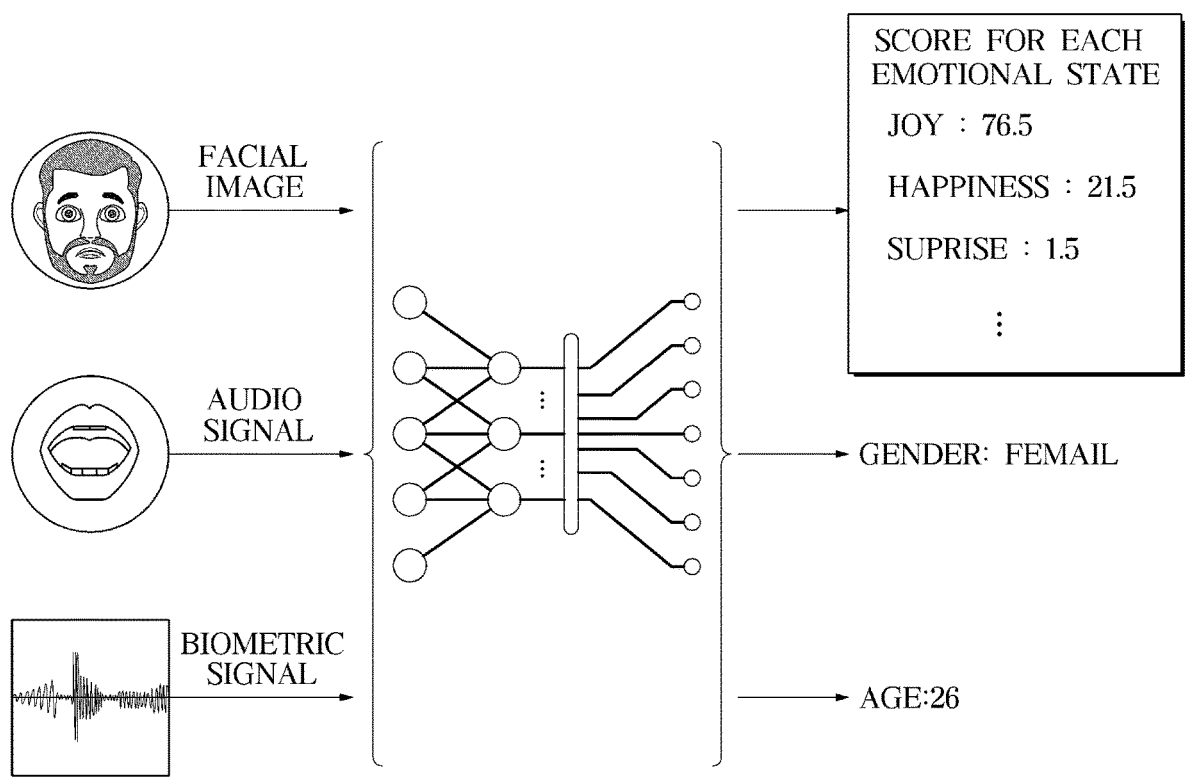
FIG. 4 is a diagram showing input data and output data of an artificial intelligence algorithm according to an exemplary embodiment.
Figure 5:
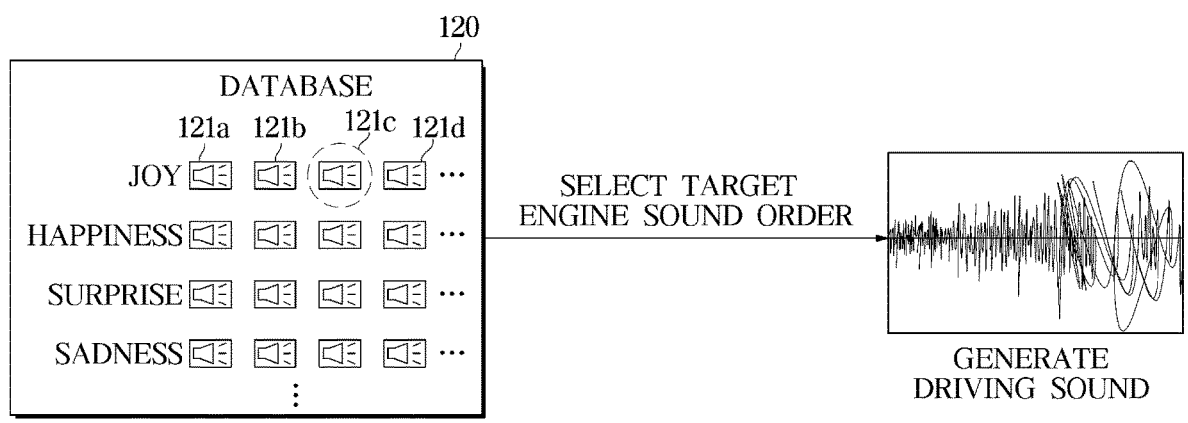
FIG. 5 is a diagram illustrating a process of generating a driving sound by a vehicle according to an exemplary embodiment.

FIG. 3 is a flowchart illustrating a vehicle control according to an exemplary embodiment, FIG. 4 is a diagram showing input data and output data of an artificial intelligence algorithm. Additionally, FIG. 5 is a diagram illustrating a process of generating a driving sound by a vehicle according to an exemplary embodiment. Referring to FIG. 3, the camera 111 according to an exemplary embodiment may be configured to acquire a driver's facial image, and the controller 130 may be configured to receive a driver's facial image from the camera 111 (1000).

Thereafter, the controller 130 may be configured to input the driver's facial image to the pre-learned R-CNN (1010). The pre-trained R-CNN may be configured to perform CNN regression analysis for each region after separating the driver's eye area using the driver's facial image as input data, separating the mouth area, and separating other areas excluding the eye area and the mouth area. Thereafter, the R-CNN may be configured to synthesize this and determine a score for each driver's emotional state after calculating scores for each emotional state for the eye area, scores for each emotional state for the mouth area, and scores for each emotional state for other areas (1020). In addition, the R-CNN may be configured to determine the sex and age of the driver by performing CNN analysis on the entire driver's face (1030).

As described above, the controller 130 may use the driver's facial image as input data of the R-CNN to determine the driver's emotional state score, sex, and age. The microphone 112 according to an exemplary embodiment may be configured to acquire an audio signal of a driver, and the controller 130 may be configured to receive an audio signal of the driver (1100). After that, the controller 130 may be configured to input the driver's audio signal to the LSTM (1110).

At this time, the controller 130 may be configured to determine the open degree of the driver's mouth based on the driver's facial image acquired from the camera 111, and input the driver's audio signal to the LSTM only when the driver's open degree is greater than or equal to a preset value. The preset value may be set in advance as an open degree in which the driver's speech may be reasonably estimated. As described above, by inputting the driver's audio signal to the LSTM only when the driver's open degree is greater than or equal to a preset value, it may be possible to effectively filter insignificant signals such as noise signals.

The pre-learned LSTM may classify a voice corresponding to an exclamation point and other voices not corresponding to an exclamation point based on the driver's audio signal. Thereafter, the LSTM may be configured to determine the score for each emotional state based on the voice corresponding to the exclamation and each of the other voices, and then synthesize the score to determine the score for each emotional state of the driver (1120).

Specifically, the LSTM may classify interjections by emotion and determine a score for each emotional state based on the number of interjections per emotion. For example, 'Wow' is classified as joy, 'Oh my' and 'Ha' are classified as sadness, and 'Hugh' and 'Really?' are classified as joy and sadness with about 50% so that scores for each emotional state may be determined in a way complements other predictions.

In addition, the LSTM may be configured to determine scores for each emotional state by analyzing the tone, pronunciation, and speech speed of other voices, and determine the score for each emotional state of the driver by synthesizing the scores. For example, when the tone of the voice is high or the speech speed is high, the emotional state score for "joy" may be determined high. The LSTM may be configured to determine the sex and age of a driver based on an audio signal of an unclassified driver (1130).

As described above, the controller 130 may be configured to determine the driver's score, sex, and age for each emotional state by using the driver's audio signal as LSTM input data. The biometric signal sensor 113 according to an exemplary embodiment may be configured to acquire a biometric signal of a driver, and the controller 130 may be configured to receive a biometric signal of the driver (1200). To remove noise and utilize a meaningful biometric signal, the biometric signal may be filtered by a first bandpass filter that passes a signal in the first frequency band and a second bandpass filter that passes a signal in the second frequency band. In particular, the first frequency band may be a low frequency region, and the second frequency band may be a high frequency region.

As described above, the first bandpass filter and the second bandpass filter may separate biometric signals for each frequency band (1210). The controller 130 may be configured to input a biometric signal for each frequency band to the LSTM (1220). Specifically, the controller 130 may use the biometric signal of the driver passing through the first bandpass filter and the biometric signal of the driver passing through the second bandpass filter as input data of the LSTM.

After that, LSTM may be configured to determine scores for each emotional state according to each frequency band by regression analysis of the driver's biometric signal in each of the first frequency band and the second frequency band, and determine a score for each emotional state of the driver based on the score for each emotional state according to each frequency band (1230). In addition, the LSTM may be configured to analyze the driver's biometric signal to determine the driver's gender and age (1240). For example, the LSTM may be configured to determine the sex and age of the driver based on the normal pulse rate for each gender/age.

As described above, based on the driver's facial image, audio signal, and biometric signal, the controller 130 may be configured to determine the emotional state with the highest score, the highest score, the driver's gender, and the driver's age among the determined driver's emotional states. For example, referring to FIG. 4, the controller 130 may be configured to determine the score for each driver's emotional state as about 76.5 points for the 'joy' state, about 21.5 points for the 'happiness' state, and about 1.5 points for the 'surprise' state. In addition, the controller 130 may be configured to determine the driver's gender as female and the age as 26 years.

Afterwards, among the driver's emotional states determined based on the driver's facial image, audio signal and biometric signal, the controller 130 may be configured to select any one of a plurality of sound sources stored in the database 120 based on the emotional state having the highest score, the highest score, the driver's gender, and the driver's age (1300). Specifically, Referring to FIG. 5, the controller 130 may be configured to determine the "joy" state, the emotional state with the highest score among the driver's emotional states, as the driver's representative emotion, and the controller 130 may be configured to select the sound source 121*c* corresponding to the "joy" state of about 76.5 points from among the plurality of sound sources 121*a*, 121*b*, 21*c*, and 121*d* classified as a "joy" state.

Additionally, the controller 130 may be configured to generate a driving sound based on the selected sound source (1400). Specifically, referring to FIG. 5, the controller 130 may be configured to determine a plurality of target engine sound orders based on at least one of the vehicle's output torque, speed, and accelerator pedal pressure, and synthesize the driving sound based on the selected sound source 121c and a plurality of target engine sound orders.

In the case of an electric vehicle, since it does not have an engine, the target engine sound order may not be selected based on the engine RPM. Accordingly, the controller 130 may be configured to estimate the RPM assuming that the vehicle is equipped with an engine based on at least one of the vehicle's output torque, speed, and accelerator pedal pressure, and determine a plurality of target engine sound orders based on the engine RPM. In other words, the database 120 or the memory 132 may be configured to store a lookup table indicating a relationship between a specific output torque of the vehicle, a specific speed, and a specific accelerator pedal pressure, and a target engine sound order, and the controller 130 may be configured to determine a plurality of target engine sound orders based on a lookup table stored in the database 120 or the memory 132.

The controller 130 may be configured to select some target engine sound orders from among target engine sound orders determined according to the lookup table among the driver's emotional states, based on the emotional state with the highest score, the highest score, the driver's gender and the driver's age. For example, it may be possible to select only the 6th and 7th as the target engine sound orders based on the driver's emotional state, age, and gender even when the target engine sound order determined based on at least one of the vehicle's output torque, speed, and accelerator pedal effort is the 1st, 2nd, 6th, and 7th order.

For example, when the driver's emotional state is sad or the driver's gender is female, only a high order may be selected as the target engine sound order to generate a high-frequency driving sound. As described above, the controller 130 may be configured to generate a driving sound by synthesizing a sound source selected from the database 120 and a signal having a selected target engine sound order.

A signal having a target engine sound order used for synthesis may be stored in the memory 132 or the database 120. Thereafter, the controller 130 may be configured to operate the speaker 140 to output the finally generated driving sound. In particular, the controller 130 may be configured to determine the volume of the driving sound based on at least one of an output torque of the vehicle, a speed, and an accelerator pedal pressure, thereby adjusting the volume of the speaker 140. For example, the controller 130 may be configured to determine the volume of the driving sound as the vehicle output torque, speed, and accelerator pedal pressure increase.

According to the vehicle and the vehicle control method according to the exemplary embodiment described above, it may be possible to provide various driving sounds that automatically reflect the driver's emotion, age, and gender preferences, instead of always the same driving sound in the vehicle. Accordingly, it may be possible to increase the marketability of the vehicle by giving the driver the pleasure of driving, and in particular, there is an advantage of providing various driving sounds to suit various drivers in future mobility fields such as shared vehicles. In addition, according to the vehicle and the vehicle control method according to an exemplary embodiment, a driving sound tailored to the driver's preference may be provided even if the same sound source is selected by differently determining the target engine sound order based on the user's preference.

Figure 6:
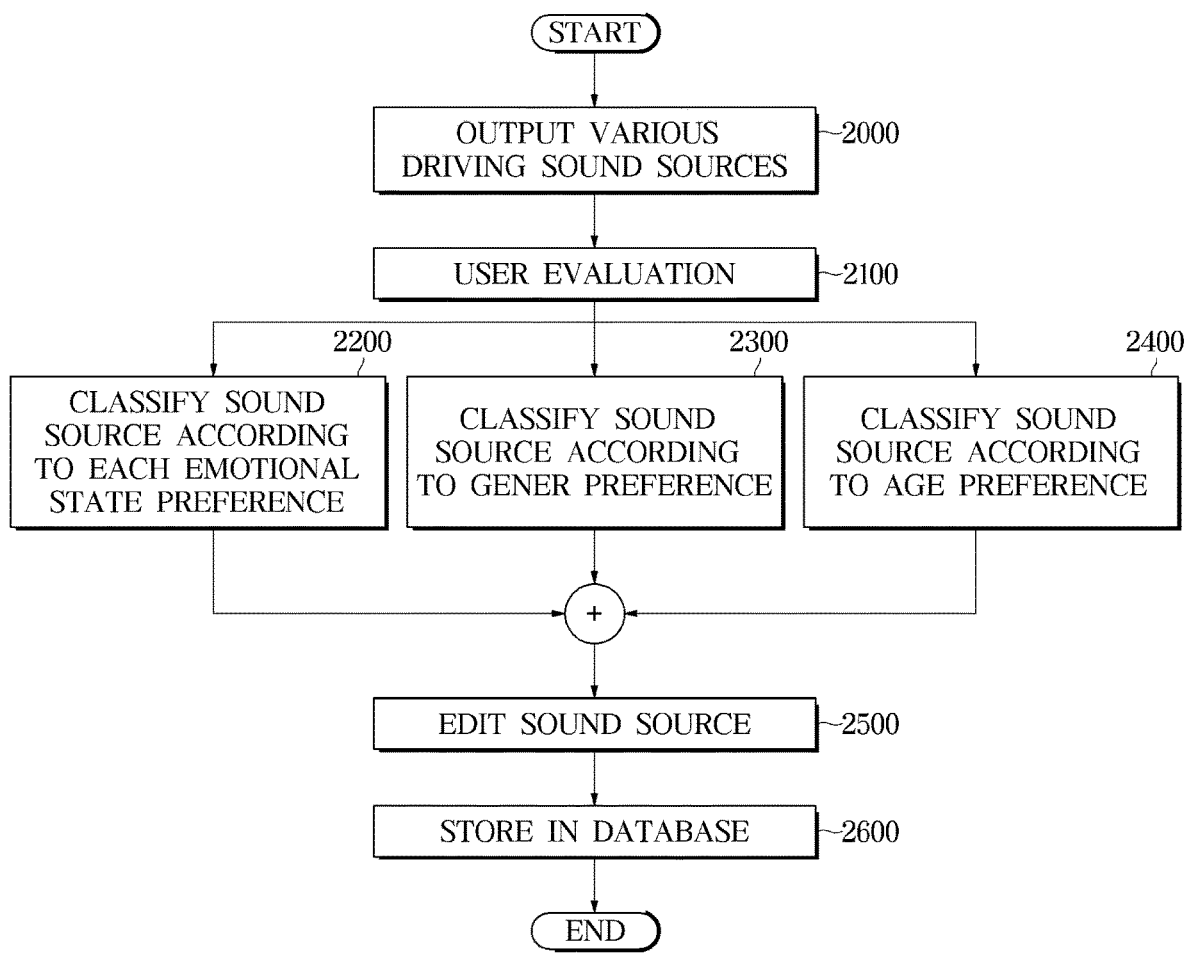
FIG. 6 is a flowchart illustrating a process for building a vehicle database according to an exemplary embodiment.

Meanwhile, the plurality of sound sources stored in the database 120 may be a plurality of sound sources stored according to the process illustrated in FIG. 6. FIG. 6 is a flowchart illustrating a process for building a vehicle database according to an exemplary embodiment. Referring to FIG. 6, by outputting various driving sound sources (2000), a plurality of evaluators may evaluate the driving sound sources (2100).

Evaluators may evaluate the driving sound source by recording their preference for the driving sound source, their emotional state, gender, and age. The operator may collect the evaluation contents of various evaluators and classify the driving sound source according to the preference for each emotional state (2200), and classify according to gender preferences (2300), and age-specific preferences (2400). Thereafter, the operator may edit the sound source (2500), matches the sound source and the preference for each emotional state, the preference for each gender, and the preference for each age, and store the matching in the database 120 (2600).

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a non-transitory computer-readable recording medium.

The non-transitory computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although exemplary embodiments of the present disclosure have been shown and described, it would be appreciated by those skilled in the art that changes may be made to these exemplary embodiments without departing from the principles and spirit of the present disclosure, the scope of which is defined in the claims and their equivalents.

According to the vehicle and a controlling method thereof according to an exemplary embodiment, it may be possible to satisfy a user's request by outputting a driving sound generated based on a driver's preference rather than outputting a uniform driving sound.

DESCRIPTION OF SYMBOLS

110: sensor
111: camera
112: microphone
113: biometric signal sensor
120: database
130: controller
131: processor
132: memory
140: speaker

What is claimed is:

1. A vehicle, comprising:
   a sensor configured to acquire at least one of a facial image of a driver, an audio signal of the driver, and a biometric signal of the driver;
   a database configured to store a plurality of sound sources classified according to driver information;
   a speaker; and a controller configured to calculate the driver information based on at least one of the facial image, the audio signal, and the biometric signal, select any one of the plurality of sound sources stored in the database based on the calculated driver information, generate a driving sound based on the selected sound source, and operate the speaker to output the generated driving sound.

2. The vehicle according to claim 1, wherein the driver information includes a score by emotional state, gender, and age of the driver.

3. The vehicle according to claim 1, wherein the sensor includes at least one of a camera configured to acquire the facial image of the driver, a microphone configured to acquire the audio signal, and a biometric signal sensor configured to acquire the biometric signal of the driver.

4. The vehicle according to claim 1, wherein the controller is configured to calculate the driver information using the facial image as input data of R-CNN (Region Based Convolution Neural Networks) that have been learned in advance.

5. The vehicle according to claim 1, wherein the controller is configured to calculate the driver information using the audio signal as input data of LSTM (Long Short-Term Memory).

6. The vehicle according to claim 5, wherein the controller is configured to determine an opening degree of the mouth of a driver based on the facial image, and use the audio signal as the input data of the LSTM only when the opening degree of the mouth is greater than a preset value.

7. The vehicle according to claim 1, wherein the controller is configured to calculate the driver information using the biometric signal as input data of LSTM (Long Short-Term Memory).

8. The vehicle according to claim 7, further comprising:
a first bandpass filter configured to pass a biometric signal in a first frequency band; and
a second bandpass filter configured to pass a biometric signal in a second frequency band;
wherein the controller uses each of the biometric signal passing through the first bandpass filter and the biometric signal passing through the second bandpass filter as input data of the LSTM (Long Short Term Memory).

9. The vehicle according to claim 1, wherein the controller is configured to determine a plurality of target engine sound orders based on at least one of an output torque, speed, and accelerator pedal pressure of the vehicle, and synthesize the driving sound based on the selected sound source and the plurality of target engine sound.

10. The vehicle according to claim 9, wherein the controller is configured to select some of the target engine sound orders of the plurality of target engine sound orders based on the calculated driver information, and synthesize the driving sound based on the selected sound source and the some selected target engine sound orders.

11. The vehicle according to claim 1, wherein the controller is configured to determine volume of the driving sound based on at least one of an output torque, speed, and accelerator pedal pressure of the vehicle.

12. A controlling method of a vehicle including a database storing a plurality of sound sources classified according to driver information, the method comprising:
acquiring, by a controller, at least one of a facial image of a driver, an audio signal of the driver, and a biometric signal of the driver;
calculating, by the controller, the driver information based on at least one of the facial image, the audio signal, and the biometric signal,
selecting, by the controller, any one of the plurality of sound sources stored in the database based on the calculated driver information,
generating, by the controller, a driving sound based on the selected sound source, and
operating, by the controller, the speaker to output the generated driving sound.

13. The method according to claim 12, wherein the driver information includes a score by an emotional state, gender, and age of the driver.

14. The method according to claim 12, wherein the acquiring of the at least one of the facial image, the audio signal, and the biometric signal; includes operating a sensor that includes at least one of a camera configured to acquire the facial image, a microphone configured to acquire the audio signal, and a biometric signal sensor configured to acquire the biometric signal.

15. The method according to claim 12, wherein the calculating of the driver information includes calculating the driver information using the facial image as input data of R-CNN (Region Based Convolution Neural Networks) that have been learned in advance.

16. The method according to claim 12, wherein the calculating of the driver information includes calculating the driver information using the audio signal as input data of LSTM (Long Short-Term Memory).

17. The method according to claim 16, wherein the calculating of the driver information includes calculating the driver information using the audio signal as input data of LSTM (Long Short-Term Memory) includes determining an opening degree of a mouth of the driver based on the facial image, and using the audio signal as the input data of the LSTM only when the opening degree of the mouth of the driver is greater than a preset value.

18. The method according to claim 12, wherein the calculating of the driver information includes calculating the driver information using the biometric signal as input data of LSTM (Long Short-Term Memory).

19. The method according to claim 18, wherein the calculating of the driver information includes calculating the driver information using the biometric signal as input data of LSTM (Long Short-Term Memory) includes using each of the biometric signal passing through the first bandpass filter passing a signal in a first frequency band and the driver's biometric signal passing through the second bandpass filter passing a signal in a second frequency band.

20. The method according to claim 12, wherein the generating of the driving sound based on the selected sound source includes determining a plurality of target engine sound orders based on at least one of an output torque, speed, and accelerator pedal pressure of the vehicle, and synthesizing the driving sound based on the selected sound source and the plurality of target engine sound.

21. The method according to claim 20, wherein the synthesizing of the driving sound based on the selected sound source and the plurality of target engine sound includes selecting some of the target engine sound orders of the plurality of target engine sound orders based on the calculated driver information, and synthesizing the driving sound based on the selected sound source and the some selected target engine sound orders.

22. The method according to claim 12, wherein the generating of the driving sound based on the selected sound source includes determining volume of the driving sound based on at least one of an output torque, speed, and accelerator pedal pressure of the vehicle.

\* \* \* \* \*